(12) United States Patent
Pohn et al.

(10) Patent No.: US 6,695,479 B2
(45) Date of Patent: Feb. 24, 2004

(54) OPEN-END SPINNING APPARATUS WITH AN AEROSTATIC RADIAL BEARING FOR A SPIN ROTOR

(75) Inventors: Romeo Pohn, Rottenegg (DE); Bernhard Stand, Kipfenberg (DE)

(73) Assignee: Rieter Ingolstadt Spinnereimaschinenbau AG, Ingolstadt (DE)

(*) Notice: Subject to any disclaimer, the term of this patent is extended or adjusted under 35 U.S.C. 154(b) by 7 days.

(21) Appl. No.: 10/071,387

(22) Filed: Feb. 8, 2002

(65) Prior Publication Data
US 2002/0110294 A1 Aug. 15, 2002

(30) Foreign Application Priority Data
Feb. 10, 2001 (DE) .......................... 101 06 204

(51) Int. Cl.[7] .................. F10C 32/06; D01H 4/12
(52) U.S. Cl. ............... 384/100; 384/107; 384/279; 384/907.1; 57/406
(58) Field of Search .................. 384/100, 114, 384/118, 107, 111, 908, 909, 907.1, 910, 911, 279; 57/103, 406, 405, 404, 407

(56) References Cited

U.S. PATENT DOCUMENTS

| | | | |
|---|---|---|---|
| 3,500,624 A | | 3/1970 | Polyakovsky et al. |
| 3,599,414 A | | 8/1971 | Polyakovsky et al. |
| 3,711,167 A | | 1/1973 | Ennis |
| 3,875,732 A | * | 4/1975 | Ellingham ............... 57/406 |
| 4,254,614 A | * | 3/1981 | Miyamoto et al. ........ 57/406 |
| 4,735,862 A | | 4/1988 | Heinzl et al. |
| 5,098,205 A | | 3/1992 | Zehndbauer et al. |

(List continued on next page.)

FOREIGN PATENT DOCUMENTS

| | | |
|---|---|---|
| DE | 1140847 | 12/1962 |
| DE | 2366046 A1 | 6/1977 |
| DE | 2632976 A1 | 1/1978 |
| DE | 2818184 B2 | 10/1979 |
| DE | 3050056 C1 | 6/1988 |
| DE | 4227909 A1 | 2/1994 |
| DE | 19648594 A1 | 5/1998 |
| DE | 19936646 A1 | 2/2000 |
| DE | 49859104 A1 | 6/2000 |
| EP | 0217445 A1 | 4/1987 |
| GB | 1415100 | 11/1975 |
| GB | 2302144 A | 1/1997 |

OTHER PUBLICATIONS

Translation of DE 1 140 847 (partial) with signed verification of translation.
Ullman's Encyclopedia of Industrial Chemistry, Fifth Ed. vol. A 21: Plastics, Properties and Testing of Polyvinyl Compounds, *Polyimides*, 1992, pp. 253–272.
Selbstschmierende und wartungsfreie Gleitlager, 1993.
Hochtemperaturbestandige Kunststoffe, E. Meckelburg, Jun. 1974.
German Search Report dated May 21, 2001.
Application for DE 100 62 106.6 (not yet published).
Japanese Abstract for JP 59–69523 (A).
Japanese Abstract for JP 55–94020 (A).
Japanese Abstract for JP 63–186030 (A).
Japanese Abstract for JP 2000009141 (A).
Japanses Abstract for JP 11158511 (A).
Partial English Translation of JP57–27212 (B2).

*Primary Examiner*—Thomas R. Hannon
(74) *Attorney, Agent, or Firm*—Dority & Manning, P.A.

(57) ABSTRACT

The invention concerns an open-end spinning apparatus with a spin-rotor, the shaft of which is supported by an aerostatic, radial bearing with an air gap between the bearing assembly and the shaft. The construction material for the bearing surface of the spin-rotor and/or the bearing surface of the radial bearing is polyimide or aramid.

27 Claims, 2 Drawing Sheets

U.S. PATENT DOCUMENTS

| | | |
|---|---|---|
| 5,126,610 A | 6/1992 | Fremerey |
| 5,275,493 A | 1/1994 | Ide |
| 5,376,062 A | 12/1994 | Zeichner |
| 5,407,280 A | 4/1995 | Heinzl et al. |
| 5,634,326 A * | 6/1997 | Wanger ........................ 57/406 |
| 5,645,354 A | 7/1997 | Heinzl et al. |
| 5,730,532 A * | 3/1998 | Knabel et al. ................. 57/406 |
| 5,765,358 A * | 6/1998 | Bock et al. .................... 57/406 |
| 5,800,068 A | 9/1998 | Wanger |
| 5,845,997 A | 12/1998 | Kinno et al. |
| 6,106,936 A | 8/2000 | Adam |
| 6,155,721 A * | 12/2000 | Kurosawa et al. ........... 384/100 |

* cited by examiner

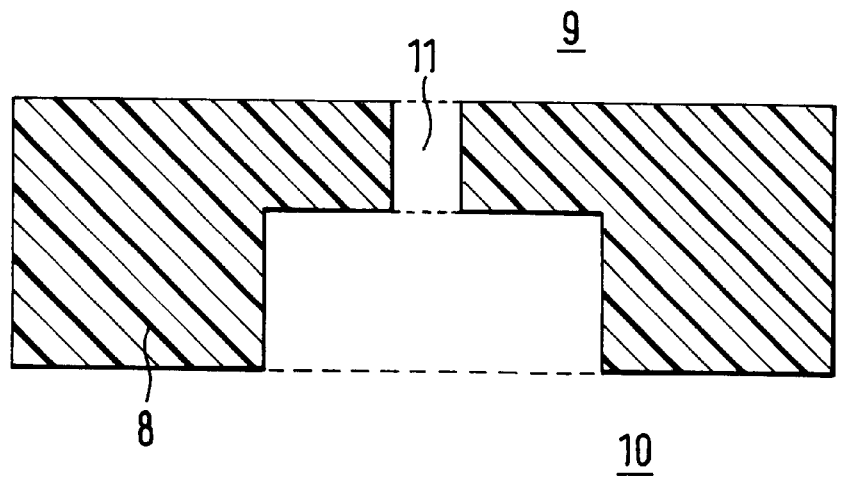
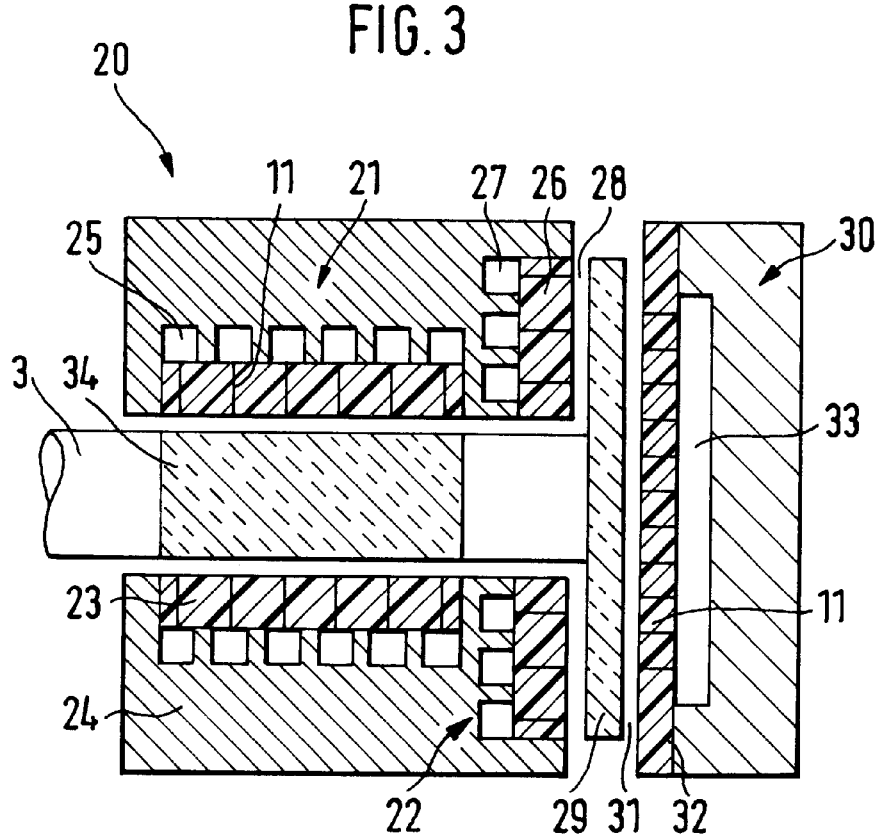

US 6,695,479 B2

OPEN-END SPINNING APPARATUS WITH AN AEROSTATIC RADIAL BEARING FOR A SPIN ROTOR

BACKGROUND OF THE INVENTION

The invention concerns an open-end spinning apparatus with a spin rotor, the shaft of which is radially supported by an aerostatic radial bearing with an air gap between the bearing assembly and the shaft. The invention further concerns the aerostatic radial bearing for this purpose.

In the case of a known open-end apparatus (JP 57-27212 B2), the shaft of a spin rotor is respectively held in radial bearings in the areas of its forward and rear ends. Through the bearing surface of the radial bearing, compressed air is introduced from the rear area thereof through openings in the direction of an air gap situated between the bearing surface of the radial bearing and the bearing surface of the spin rotor. In normal operation, this aerostatic radial bearing makes possible a bearing for a spin rotor which is free from abrasion and friction.

During operation of open-end spin rotors, however, severe running conditions sometimes occur in such a manner, that an impact between the shaft and the bearing surface happens. These severe running conditions are caused, for example, by imbalance in the spin rotor due to worn drive belts or a jointure in the drive belts. A contacting between the bearing surface of the shaft and the bearing surface of the radial bearing does not necessarily mean a failure of the bearing in service or that the aerostatic radial bearing is immediately unusable because of the contacting.

OBJECTS AND SUMMARY OF THE INVENTION

Therefore, it is a principal purpose of the invention to improve an open-end spinning apparatus and the associated radial bearing in such a manner, that the operational life of the radial bearing is substantially increased. Additional objects and advantages of the invention will be set forth in part in the following description, or may be obvious from the description, or may be learned through practice of the invention.

This principal purpose is achieved by having in the case of the bearing surface pairing of the bearing surface of the spin rotor and the bearing surface of the radial bearing, at least one of the bearing surfaces is made from a basic material of polyimide or aramid.

The use of a high temperature resistant plastic substance in the bearing surface makes possible, upon a tilt of the spin rotor and a touching of the two bearing surfaces, a resilient damping. Thereby, the contact of the rotor shaft on the radial bearings does not lead to such a hard impact of the rotor against the radial bearing that damage would be caused to the shaft or the bearing. An aramid, in a particular para-aramid, is installed here, for example, either pure or as a fiber composite. The material can be found from commercial sources, for instance, under the market name Kevlar®.

By the use of the materials polyimide or aramid, a material pairing is obtained, which has a low friction value, is not temperature sensitive, and is particularly resistant to mechanical loading. Polyimides or aramids make available a radial bearing with a high structural and tensile strength for the bearing material, including the bearing surfaces. Besides the favorable frictional characteristics, advantageously, a particularly pronounced ability to withstand mechanical loading also is made possible, especially by the resistance to wear of the materials, polyimide or aramid. By this means, the negative effects of mechanical contacts between the bearing surface of the spin rotor and the bearing surface of the radial bearing are essentially lessened.

These bearing materials, moreover, are in a position to easily resist mechanical loads on the bearing. This is true, not only during operation, but, for example, also during the installation of the spin rotor in the radial bearing in which the air gap between the bearing surfaces allows only a minimal amount of play. By this characteristic, manufacturing errors are reduced and likewise, a contribution to the improvement of the bearing is made. These advantages also become evident, if one or both bearing surfaces are coated with a polyimide or aramid, which acts in a manner corresponding to the above.

Moreover, the materials are readily workable, whereby the retaining of dimensional tolerances during the manufacturing is assured. This workability advantageously also provides that the durability of the bearings is improved, since a precise construction in accord with the design specifications can be carried out simply and safely.

Because the spin rotor is subjected to continuous, extreme loading, abrasive wear does occur in spite of the high resistance of the materials polyimide or aramid to abrasion and their high degree of wear resistance. Where the use of the materials in the bearing surfaces of the spin rotor is concerned, on account of this possible wear, it is advantageous to design the bearing surfaces so that these are removable from the spin rotor and by means of a new coating or by a new bearing installation can be effectively replaced. It is advantageous, when employing these materials in the bearing surfaces of the radial bearing, to provide an insert, which carries the radial bearing surface. This insert can be a releasable holding means, serving as an exchangeable component.

In an advantageous improvement of the invented radial bearing, the polyimide or aramid material possesses a particularly favorable additive, this being graphite, Teflon®, molybdenum disulfide or a mixture of these.

Favorably, the portion of this additive lies between 10 and 45%, preferably more than 20%. Thereby, a particularly lower friction factor of the bearing material is achieved, allowing the wear by mechanical contact between the bearing surfaces again to be reduced. In regard to the use of favorable basic materials for the bearing surfaces, full recognition is given to U.S. Pat. No. 6,401,444 B1, which corresponds to Application No. DE 100 14 861.

By the use of porous materials for bearing surfaces, compressed air can be introduced from the outer circumference of the bearing surface through the porous channels in the material toward the bearing gap between the bearing surfaces. The porous material assures a uniform distribution of the air input without further work-up of the bearing surface material being necessary. For instance, the porous material can be sintered out of polyimide powder with or without the above mentioned additives. Simultaneously, the porous material acts as a throttling device for the application of the air flow into the air gap. In regard to the characteristics of the porous material and the throttle device, examples can be seen in Application DE 100 62 106.

Alternatively, or additionally, to the porous channels in the porous material, in one or both of the bearing surfaces, several borings can be provided. Through these borings, the compressed air is introduced from the rear side to the air gap. For uniform distribution of the air in the air gap, the outlet openings of the borings are advantageously axially aligned and so placed that they are also circumferentially offset from one another. If, instead of borings, micro-openings are employed, then the compressed air entering the air gap can be very precisely adjusted. Additionally, the air flow through the micro-openings is minimal, so that, upon any axial deviation of the rotor shaft toward the radial bearing, the position-restoring air flow, i.e., the compressed air, cannot be forced back into the inlet openings. This air flow markedly increases the rigidity of the bearing. In regard to the formation of the micro-openings and their distribution over an area, particularly on the bearing surface, examples can be seen in DE 100 62 106.

For an additional increase of the operational life of the radial bearing, a material-pairing is employed in the case of the two opposed bearing surfaces in which the material of the one bearing surface is a hard material, or is coated therewith, so that practically no erosion occurs even by touching against an oppositely situated bearing surface, which contains polyimide or aramid.

In accord with another embodiment, in addition to the radial bearing, an axial bearing is installed to serve as an aerostatic axial bearing with an air gap between a bearing fixture thereon and the shaft end of the spin-rotor. The placement of the bearing surface pairing between the axial bearing apparatus and the shaft end or a confronting device on the shaft end, such as a disk, corresponds to the already described bearing surface pairing between the bearing surface of the spin-rotor and the bearing surface of the radial bearing. In this way, a lubrication-free bearing system is achieved for the axial bearing, and consequently, the operational life of this bearing is also extended. In regard to the placement of the aerostatic axial bearing, again examples can be seen in DE 100 62 106.

With the aid of the drawings, embodiment examples of the invention are explained in the following.

BRIEF DESCRIPTION OF THE DRAWINGS

FIG. 2 shows a detailed presentation of a micro opening in the aerostatic bearing; and FIG. 3 shows a second embodiment of an aerostatic bearing.

DETAILED DESCRIPTION

Figure 1:
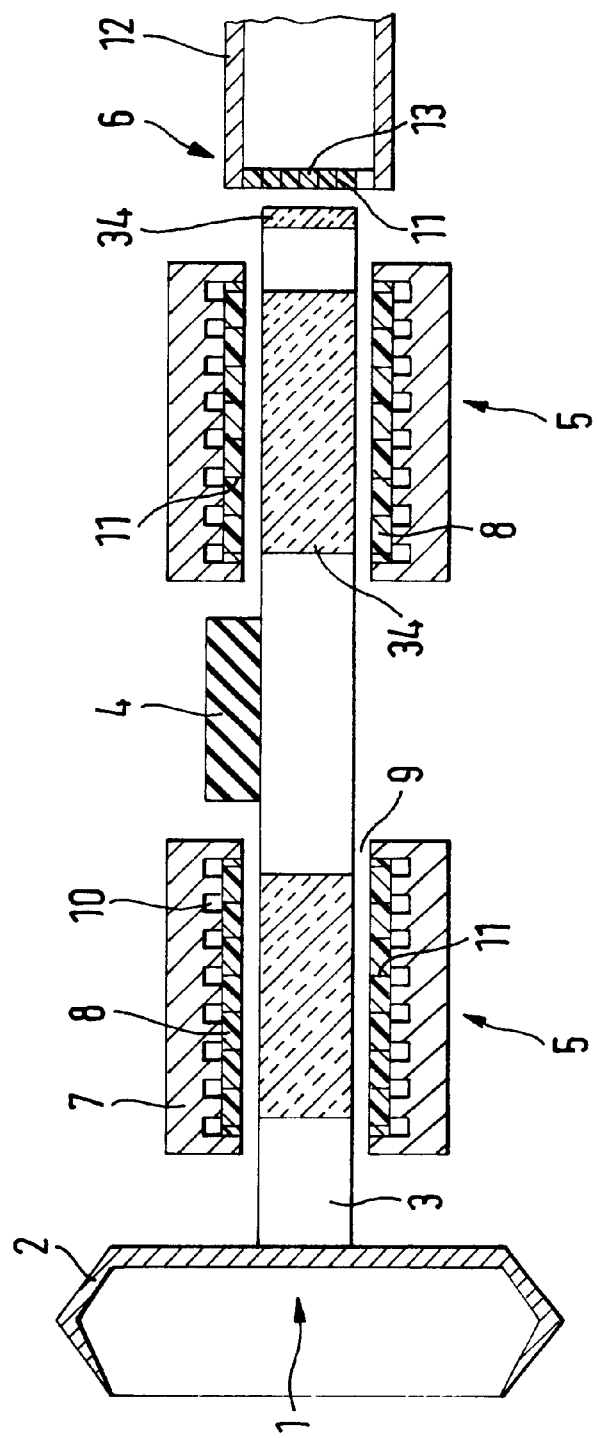
FIG. 1 shows a spin-rotor, which is set in an aerostatic radial bearing and an axial bearing.

FIGS. 1 and 3 show part of an open-end spinning apparatus possessing a spin-rotor 1 with a shaft 3 supported by an aerostatic radial bearing 5, 21 having an air gap 9 between the radial bearing 5, 21 and the shaft 3. A bearing surface 34 of the spin-rotor 1 coacts with a bearing surface 8, 23 of the radial bearing 5, 21. Due to this coaction, it is desirable to have the bearing surface 34 of the spin-rotor 1 and/or the bearing surface 8, 23 of the radial bearing 5, 21 manufactured from a basic material of polyimide or aramid.

FIG. 1 shows the spin-rotor 1 of the open-end spinning apparatus with a rotor plate 2 and the shaft 3. The shaft 3 is placed in rotation by a drive belt 4, which tangentially encompasses part of the circumference of the shaft. The bearing support of the shaft 3 in a radial direction is carried out by two identical radial bearings 5. The end bearing axial support is carried out by an axial bearing 6, which is placed on that end of the shaft 3 that is remote from the rotor plate 2.

In the case of the embodiment shown in FIG. 1 of the rotor shaft bearing assembly, an axial force, which acts in the direction of axial bearing 6, is countered by the slightly offset run of the drive belt 4 over the shaft 3. In this case, the belt 4 does not approach the shaft 3 at an angle of 90° to the axis thereof, but at a slightly less angle. If the shaft 3, as seen in FIG. 1, rotates with the upper side turning into the plane of the drawing, and the underside, so to speak, "emerging" therefrom, then the drive belt 4 would be offset (as the drawing is viewed) slightly to the right.

Alternative to this, the axial force acting in the direction of the axial bearing 6 could be achieved by a slightly conical tapered design of the shaft 3 in the belt 4 contact area. In this case, the conical taper of the shaft in the drawing orientation reduces itself from the rotor end of the belt 4 contact area towards the axial bearing end of the same (left to right).

The bearing surface, or shell, 8, within a radial bearing housing 7 of the radial bearing 5, is placed so as to circumferentially enclose the shaft 3. On the rear surface of the wall of the shell 8, that is, on that side of the shell 8 distal from the air gap 9, are constructed compressed air chambers 10 running annularly about the rotor shaft but within the radial bearing housing 7. The compressed air chambers 10 are connected with an air channel (not shown) running in the axial direction. The channel, in turn, is connected to a compressed air source, so that, in the compressed air chambers 10, pressurized air is made available for introduction into the air gap 9.

In the shell 8 of the bearing housing 7 are placed micro-openings 11, running in a radial direction. These micro-openings 11, because of their small diameter, are shown only as short lines in FIG. 1. In order to assure a uniform inflow of pressurized air into the air gap 9, the micro-openings 11 are offset to one another in an axial direction. For clarity, the micro-openings 11 in FIG. 1 are shown as lying in a cross sectional plane. In fact, these micro-openings are distributed offset from one another also in a circumferential direction along the inner surface of the bearing shell 8.

The bearing shells 8 are essentially made of a polyimide or aramid in which friction reducing additives such as Teflon® (fluorocarbon polymers such as polytetrafluoroethylene or perfluoroalkoxy resin) or graphite have been incorporated. These additives, forming a matrix like structure of the bearing shell 8, assure a gall-free running characteristic with less friction.

Inset at the forward end of the cylindrical body 12 of the axial bearing 6, is a replaceable bearing plate 13. This bearing plate 13 is constructed of the same material as the bearing shell 8 and possesses, likewise, micro-openings 11, which run in an axial direction to the shaft 3.

FIG. 2 demonstrates a portion of a cross-section through the bearing surface of the bearing shell 8 with a micro-opening 11 constructed therein. The following description of the micro-opening is applicable to the micro-openings in the bearing surface of the bearing plates 13 or 32 and 26 of the axial bearing 6 or 30 and 22. On the rear side of the bearing shells, however, which border on the compressed air chambers 10, the cross-sections of the micro-openings have been widened. The diameter of the widened zones measures more than 100 μm, preferably more than 1 mm, so that the widened zone of the micro-openings can be bored with a conventional tool, i.e., can be so manufactured. The part of the micro-openings 11 which are continuous to the air gap 9 possess a cross-section of less than 100 μm and are made by a special procedure, namely boring by laser.

The diameter of the small diameter openings runs for some from 80 μm to 100 μm, preferably for others from 20 μm to 50 μm. Since the shell 8 section containing the micro-openings 11, which borders onto the air gap 9, is thin, the micro-openings 11 need be provided only in a small range of depth. The depth of the micro-opening 11 with the small cross-section can lie in the range of 50 μm to 3 mm. In spite of abrasion of the bearing shell 8 from the surface of the shaft 3, which occurs during long run operations, the diameter of the small cross-sectional micro-openings 11 remains constant throughout their depth, so that, in spite of probable occurring wear of the bearing shell 8, the air flow through the cross-section of the narrowed micro-openings 11 permits adjustment. Because of this arrangement, the incoming air flow into the air gap 9 is very exactly determined. The same can be said in regard to the bearing plate 32 and the bearing disk 26. (See below.)

FIG. 3 shows a second embodiment for the axial bearing of the spin-rotor 1. The rotor plate 2 and the radial bearing 5 which is adjacent to the spin-rotor 1, as well as the drive with the drive belt 4 are exactly the same as depicted in FIG. 1. At the end of the shaft 3 distal from the rotor plate 2 is located an aerostatic bearing assembly 20 comprising the radial bearing 21 and a first axial bearing 22. In a recess of the radial bearing 21 is inserted the bearing shell 23, on the back surface of which are pressurized air chambers 25, which are circumferentially installed in a bearing housing 24. In a radial direction to shaft 3, are situated micro-openings 11, as previously described.

In the rear end surface of the bearing housing 24 is inserted a bearing disk 26, which is made in a corresponding manner to the bearing plate 13 or the bearing shell 8 or 23. In the bearing housing 24 are designed concentric, circularly shaped, pressurized air chambers 27, which are supplied with compressed air. It is from these that the micro-openings 11 in the bearing plate 26 allow pressurized air to be introduced into the air gap 28. On the rear end of the shaft 3, a ceramic disk 29, preferably a silicon carbide disk, is affixed by adhesive means. This ceramic disk 29 serves as opposition for the bearing disk 26. By means of the first axial bearing 22, an axial force acting on the shaft 3 in the direction of the rotor plate 2 is absorbed.

Opposite to the rear side of the ceramic disk 29 is placed a second axial bearing 30. The second axial bearing 30 is subjected to an axial force, which acts in the direction of the bearing. In this way, the shaft 3 is held fast in its axial position, so that this shaft 3 cannot be axially moved. In the case of this embodiment example, the rotor plate 2 is advantageously releasably connected to the shaft 3, so that the rotor plate 2 can be replaced without a concomitant exchange of the shaft 3. Pressurized air, by means of micro-openings 11 in a bearing plate 32, is introduced into an air gap 31 of the second axial bearing 30. The pressurized air is supplied to the back side of the bearing plate 32 by a compressed air chamber 33.

For increasing the operational life of the spin-rotor 1, at least in the areas of the opposed surfaces, the bearing surface 34 can be a silicon carbide coating applied onto the shaft 3 of the spin rotor. These areas are depicted in FIG. 1, and lie in the areas of the forward and rear radial bearings 5, 21. The silicon carbide coating 34 is placed opposite to the surfaces of the bearing shell 8, 23.

In some instances, the bearing surface 8, 23, 34 of the radial bearing 5, 21 or the spin-rotor 1 may be produced from a porous material.

In the case of the first embodiment, additionally the rear portion of the shaft 3 is coated with the silicon carbide layer. As seen in the embodiment of the second radial bearing as presented in FIG. 3, the ceramic disk 29 can be replaced by a low inertia disk, which is coated with a ceramic layer, preferably with a coating of silicon carbide.

It will be appreciated by those skilled in the art that various modifications and variations can be made in the present invention without departing from the scope of the invention. It is intended that the present invention include such modifications and variations as come within the scope of the appended claims and their equivalents.

What is claimed is:

1. An open-end spinning apparatus for use in a workstation within an open-end spinning machine containing a plurality of said workstations, said apparatus comprising:

a spin rotor having a shaft operably disposed thereto and being carried within said workstation of said open-end spinning machine, said spin rotor spinning fibers fed to said open-end spinning apparatus into a yarn;

a drive belt operably disposed within said open-end spinning machine, said drive belt engaging said shaft of said spin rotor in such a manner that said spin rotor rotates at an operational speed;

an aerostatic radial bearing operably surrounding a circumferential area of said shaft, said aerostatic radial bearing supporting said shaft of said spin rotor by supplying compressed air to an air gap formed between said aerostatic radial bearing and said shaft stabilizing said spin rotor in a radial direction during operation of said open-end spinning machine;

a shaft bearing surface operably disposed to said shaft of said spin rotor;

a radial bearing surface operably disposed to said aerostatic radial bearing, said radial bearing surface and said shaft bearing surface operably aligning during operation of said open-end spinning machine; and wherein at least one of said radial bearing surface and said shaft bearing surface is made of a bearing material that includes at least one of a polyimide and an aramid material.

2. An open-end spinning apparatus as in claim 1, wherein said bearing material includes an additive.

3. An open-end spinning apparatus as in claim 2, wherein said additive is graphite, a fluorocarbon polymer, or molybdenum disulfide ($MOS_2$).

4. An open-end spinning apparatus as in claim 2, wherein said additive is a mixture of graphite, a fluorocarbon polymer; and molybdenum disulfide ($MOS_2$).

5. An open-end spinning apparatus as in claim 2, wherein said additive is between 10% to 45% of said bearing material.

6. An open-end spinning apparatus as in claim 2, wherein said additive is greater than 20% of said bearing material.

7. An open-end spinning apparatus as in claim 2, wherein at least one of said radial bearing surface and said shaft bearing surface is a porous material.

8. An open-end spinning apparatus as in claim 1, wherein said radial bearing surface forms a plurality of borings to allow the passage of compressed air.

9. An open-end spinning apparatus as in claim 8, wherein said borings formed by said radial bearing surface are distributed over the entire area of said radial bearing surface.

10. An open-end spinning apparatus as in claim 9, wherein said borings formed by said radial bearing surface are created in radial direction and are circumferentially offset from each other.

11. An open-end spinning apparatus as in claim 10, wherein at least a portion of said borings formed by said radial bearing surface are micro-openings.

12. An open-end spinning apparatus as in claim 11, wherein said micro-openings formed by said radial bearing surface allow adjustment of an air quantity conducted to said air gap formed between said aerostatic radial bearing and said shaft.

13. An open-end spinning apparatus as in claim 1, wherein said bearing material of said radial bearing surface includes said at least one of a polyimide or an aramid and said bearing material of said shaft bearing surface includes at least one of a hard material and a hard material coating.

14. An open-end spinning apparatus as in claim 13, wherein said hard material is a ceramic.

15. An open-end spinning apparatus as in claim 14, wherein said ceramic is a silicon carbide.

16. An open-end spinning apparatus as in claim 1, wherein said bearing material of said shaft bearing surface includes said at least one of a polyimide and an aramid, and said bearing material of said radial bearing surface includes at least one of a hard material and a hard material coating.

17. An open-end spinning apparatus as in claim 16, wherein said hard material is a ceramic.

18. An open-end spinning apparatus as in claim 17, wherein said ceramic is a silicon carbide.

19. An open-end spinning apparatus as in claim 1, further comprising an aerostatic axial bearing operably disposed proximal to an end of said shaft of said spin rotor that is distal to an end of said spin rotor where said yarn is spun, said aerostatic axial bearing supporting said shaft of said spin rotor by supplying compressed air to an air gap formed between said aerostatic axial bearing and said shaft stabilizing said spin rotor in an axial direction during operation of said open-end spinning machine.

20. An open-end spinning apparatus as in claim 19, further comprising an axial bearing surface disposed to said aerostatic axial bearing, said axial bearing surface and said end of said shaft of said spin rotor that is distal to an end of said spin rotor where said yarn is spun operably aligning during operation of said open-end spinning machine.

21. An open-end spinning apparatus as in claim 20, wherein said axial bearing surface is made of a bearing material that includes at least one of a polyimide and an aramid material.

22. An open-end spinning apparatus as in claim 21, wherein said bearing material of said axial bearing surface includes an additive and at least one of a polyimide and an aramid material.

23. An open-end spinning apparatus as in claim 22, wherein said additive is graphite, a fluorocarbon polymer, or molybdenum disulfide ($MOS_2$).

24. An open-end spinning apparatus as in claim 22, wherein said additive is a mixture of graphite, a fluorocarbon polymer, and molybdenum disulfide ($MOS_2$).

25. An open-end spinning apparatus as in claim 22, wherein said additive is between 10% to 45% of said bearing material of said axial bearing surface.

26. An open-end spinning apparatus as in claim 22, wherein said additive is greater than 20% of said bearing material of said axial bearing surface.

27. An open-end spinning apparatus as in claim 21, wherein said axial bearing surface is a porous material.

* * * * *